United States Patent
Al-Heraibi

(10) Patent No.: US 9,139,309 B1
(45) Date of Patent: Sep. 22, 2015

(54) GROUND-BASED RECOVERY SYSTEM FOR AIRCRAFT WITH DISABLED LANDING GEAR

(71) Applicant: Abdulrahman S. J. M. Al-Heraibi, Rabiya (KW)

(72) Inventor: Abdulrahman S. J. M. Al-Heraibi, Rabiya (KW)

(*) Notice: Subject to any disclaimer, the term of this patent is extended or adjusted under 35 U.S.C. 154(b) by 0 days.

(21) Appl. No.: 14/340,525

(22) Filed: Jul. 24, 2014

(51) Int. Cl.
  *B64F 1/02* (2006.01)
  *B64F 1/10* (2006.01)

(52) U.S. Cl.
  CPC .. *B64F 1/025* (2013.01); *B64F 1/10* (2013.01)

(58) Field of Classification Search
  CPC ............. B64C 25/02; B64F 1/02; B64F 1/04; B64F 1/10; B64F 5/00; B64F 1/06; B64F 5/0009; B64F 1/12; B64F 1/22; B64F 1/28; B64F 5/0081; B64F 1/227; B64F 1/228; B64F 1/007; B64F 1/08; B64F 1/125; B64F 1/14
  USPC ........... 244/110 E, 120, 110 R, 110 F, 110 G, 244/110 H
  See application file for complete search history.

(56) References Cited

U.S. PATENT DOCUMENTS

| | | | | |
|---|---|---|---|---|
| 2,234,752 A * | 3/1941 | Fleet et al. | | 244/110 G |
| 2,246,716 A | 6/1941 | Bottrill | | |
| 2,346,633 A * | 4/1944 | Bottrill | | 244/110 E |
| 2,769,604 A * | 11/1956 | Hudson et al. | | 244/135 A |
| 2,783,005 A * | 2/1957 | Kane | | 244/63 |
| 2,843,337 A * | 7/1958 | Bennett | | 244/2 |
| 3,003,717 A * | 10/1961 | Booker | | 244/2 |
| 3,128,066 A * | 4/1964 | Bailey | | 244/114 R |
| 3,210,029 A * | 10/1965 | Brusch et al. | | 244/114 R |
| 3,291,242 A * | 12/1966 | Tinajero | | 180/116 |
| 3,298,633 A * | 1/1967 | Dastoli et al. | | 244/2 |
| 3,330,501 A * | 7/1967 | Barber | | 244/47 |
| 3,490,722 A * | 1/1970 | Kucken et al. | | 244/114 R |
| 3,567,159 A * | 3/1971 | Klein | | 244/114 R |
| 4,462,560 A * | 7/1984 | Earl | | 244/63 |
| 4,598,883 A * | 7/1986 | Suter | | 244/1 R |
| 4,653,706 A * | 3/1987 | Ragiab | | 244/110 E |
| 5,000,398 A * | 3/1991 | Rashev | | 244/2 |
| 5,123,615 A * | 6/1992 | Wagner et al. | | 244/116 |
| 5,150,860 A * | 9/1992 | Young | | 244/63 |

(Continued)

FOREIGN PATENT DOCUMENTS

| | | |
|---|---|---|
| DE | 4102271 | 7/1992 |
| DE | 19950674 | 4/2001 |
| DE | 102007052277 | 11/2009 |

*Primary Examiner* — Tien Dinh
*Assistant Examiner* — Assres H Woldemaryam
(74) *Attorney, Agent, or Firm* — Richard C. Litman

(57) ABSTRACT

The ground-based recovery system for aircraft with disabled landing gear includes an in-ground recovery vehicle channel in which an aircraft recovery vehicle travels. Additional lateral slots contain lateral wheel trucks extending from the vehicle to secure the vehicle positively within the channel. The vehicle is preferably powered by at least one turbojet engine and has an aircraft recovery cradle extending therefrom, the cradle articulating to capture and support the disabled aircraft. The cradle includes wing supports and leading and trailing edge retaining arms to prevent relative movement of the disabled aircraft on the recovery vehicle. Additional retaining straps are deployed from the sides of the cradle to secure the aircraft positively to the recovery vehicle. The recovery vehicle is accelerated along its channel to match its speed closely to the landing speed of the disabled aircraft, enabling the aircraft to land upon the vehicle cradle without significant damage.

12 Claims, 5 Drawing Sheets

(56) References Cited

U.S. PATENT DOCUMENTS

| | | | |
|---|---|---|---|
| 5,170,966 A * | 12/1992 | Sheu | 244/110 E |
| 6,293,487 B1 * | 9/2001 | Gaite | 244/3 |
| 6,371,410 B1 * | 4/2002 | Cairo-Iocco et al. | 244/100 A |
| 6,394,391 B1 * | 5/2002 | Lo | 244/110 E |
| 6,695,255 B1 * | 2/2004 | Husain | 244/110 E |
| 7,568,658 B2 * | 8/2009 | Li | 244/110 E |
| 7,607,608 B2 * | 10/2009 | Morris et al. | 244/50 |
| 2008/0308673 A1 * | 12/2008 | Liu | 244/110 R |
| 2009/0014587 A1 * | 1/2009 | Bertani | 244/120 |
| 2012/0158221 A1 * | 6/2012 | Al Fadhli | 701/16 |
| 2012/0187243 A1 * | 7/2012 | Goldie et al. | 244/110 |

* cited by examiner

GROUND-BASED RECOVERY SYSTEM FOR AIRCRAFT WITH DISABLED LANDING GEAR

BACKGROUND OF THE INVENTION

1. Field of the Invention

The present invention relates generally to aviation safety systems, and particularly to a ground-based recovery system for aircraft with disabled landing gear.

2. Description of the Related Art

Relatively high speed aircraft generally incorporate retractable landing gear in order to reduce aerodynamic drag and to increase efficiency and fuel economy in flight. While this is primarily true of airplanes, i.e., fixed wing powered aircraft, it is also true of higher performance helicopters, and even many types of gliders or sailplanes insofar as increasing aerodynamic efficiency is concerned.

The designers and manufacturers of aircraft with such retractable landing gear systems endeavor to design and construct such systems to have the highest practical reliability. Nevertheless, the occasional landing gear system failure can and will occur with such aircraft. This may be due to any of a number of causes, such as depletion of hydraulic fluid due to a leak, a mechanical component becoming disconnected or jammed by foreign matter, etc. In such instances, the flight crew of the aircraft has no alternative but to land the aircraft with the landing gear retracted, assuming that it has not locked or jammed at some intermediate position. Such potential occurrences have been planned for at all certified air carrier airports, so that firefighting vehicles are on hand that are capable of deploying foam on a runway to reduce the chance of fire during or after the wheels-up landing.

Nevertheless, landing a retractable gear aircraft with the landing wheels retracted is still a risky operation. The larger and heavier the aircraft and the number of passengers being carried and the greater the landing speed, the greater chance there is of significant damage to the aircraft and/or injury to passengers. Even in the event of a successful wheels-up landing by a large air carrier aircraft, there will be significant damage to the aircraft structure due to the significantly greater forces and speeds encountered during such a landing. Such damage may well result in repair costs greater than the value of the aircraft, even when the obvious external damage to aircraft skin panels does not initially appear to be great.

Accordingly, a number of ground-based systems for recovering a retractable landing gear aircraft with wheels retracted have been developed in the past. An example of such is found in German Patent Publication No. 4102271 published on Jul. 30, 1992 to Airbus GMBH et al. This reference describes (according to the drawings and English abstract) a ground-based system for launching and recovering compatibly configured aircraft devoid of landing gear as a normal operation.

German Patent No. 19950674, published on Apr. 26, 2001, describes (according to the drawings and English abstract) a mobile landing surface that is accelerated to substantially match the landing speed of the aircraft using the mobile surface. The mobile surface is installed atop a conventional fixed runway to travel therealong as needed for the recovery of an aircraft. Various speed sensing devices, pads, cushions, and shock absorption devices are included on the mobile platform.

German Patent No. 102007052277, published on Nov. 5, 2009, describes (according to the drawings and English abstract) a method for landing an aircraft with fully or partially retracted landing gear. An emergency carriage is provided with backup systems. The carriage may be an autonomous, motorized, remotely controlled device.

Thus, a ground-based recovery system for aircraft with disabled landing gear solving the aforementioned problems is desired.

SUMMARY OF THE INVENTION

The ground-based recovery system for aircraft with disabled landing gear comprises a recovery vehicle channel or trench in which a recovery vehicle may travel. The channel is sufficiently deep to position a substantial majority of the recovery vehicle below grade. Mutually opposed lateral slots are formed in the sides of the channel. Corresponding wheel trucks extend from the recovery vehicle to ride along the lateral slots. The wheel trucks and slots provide positive retention of the recovery vehicle within the channel, and preclude departure of the recovery vehicle from the channel. Additional aids for clearing fog and visible moisture from the area of the channel, and for providing additional lighting aids to enable the pilot of the disabled aircraft to more clearly see the recovery vehicle and its channel, are also provided along the sides of the channel.

An articulating cradle is disposed atop the recovery vehicle. The cradle has various systems to facilitate the alignment of the disabled aircraft with the cradle and to cushion the landing of the disabled aircraft on the cradle. Various devices for positively securing and retaining the disabled aircraft on the cradle are also provided.

The recovery vehicle is preferably powered by at least one turbojet engine that is used to accelerate the vehicle along the channel to substantially match the landing speed of the disabled aircraft. A recovery vehicle operator and systems engineer or operator are aboard the recovery vehicle to drive the recovery vehicle and to operate its systems during the recovery operation. Additional safety features, such as fire-extinguishing devices, may be deployed as well to extinguish any engine fires that may occur on the disabled aircraft during the recovery operation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The ground-based recovery system for aircraft with disabled landing gear comprises a ground-based vehicle that is accelerated to match the landing speed of the disabled aircraft so that the aircraft may land atop the ground-based vehicle. The ground-based vehicle, carrying the disabled aircraft resting thereon, is decelerated to a smooth stop without damage to the aircraft or harm to the passengers.

Figure 1:
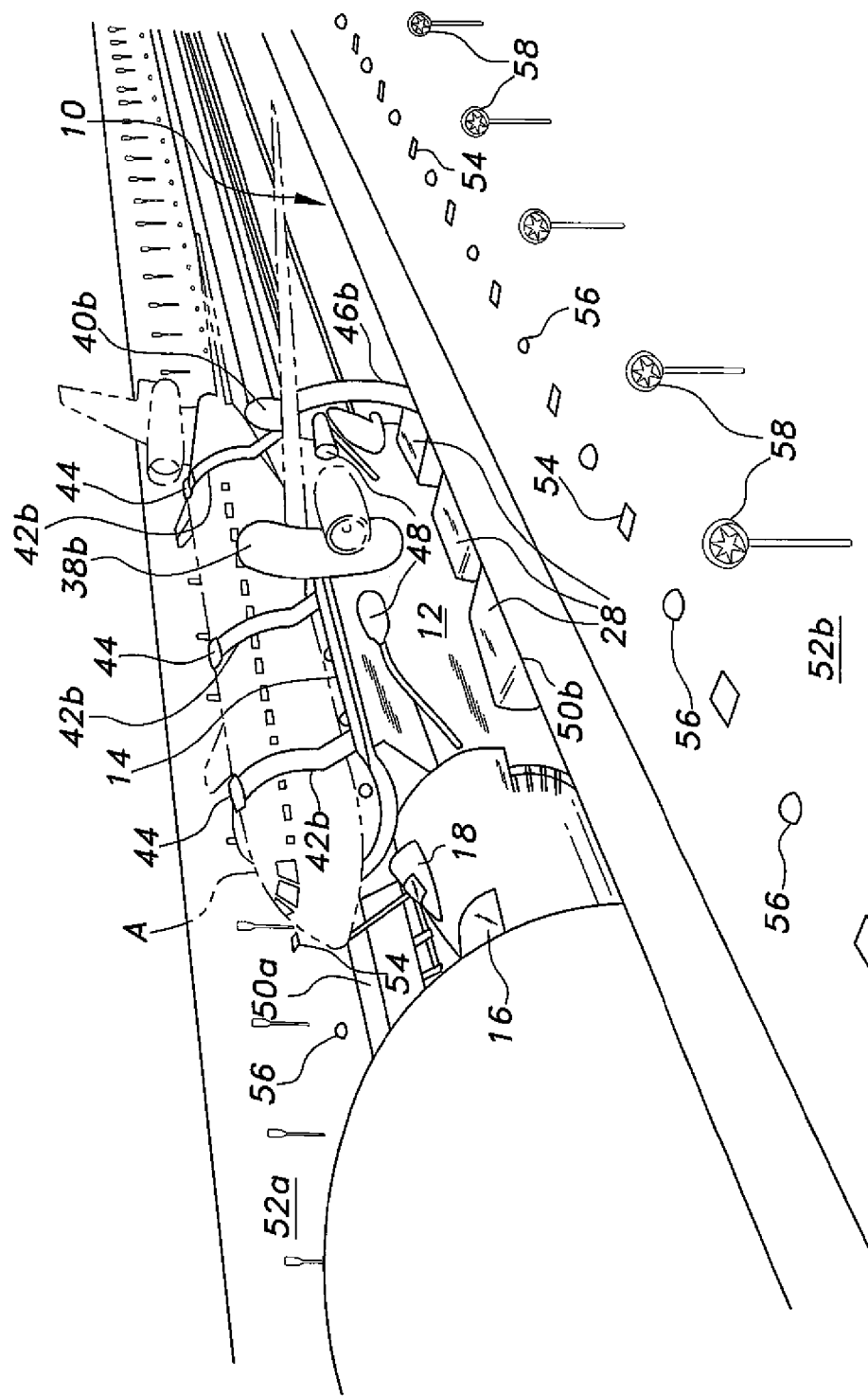
FIG. 1 is a perspective view of a ground-based recovery system for aircraft with disabled landing gear according to the present invention, showing the recovery end of the recovery vehicle channel and laterally disposed aids, and showing a disabled aircraft (in phantom) secured thereon.

FIG. 1 of the drawings provides an environmental perspective view of the recovery system. An aircraft A with disabled landing gear is shown in broken lines atop the recovery vehicle. The system includes a recovery vehicle channel 10 formed in the ground. It will be recognized that the recovery vehicle channel 10 may be constructed at an existing airport, but this is not a requirement. The channel 10 and other recovery apparatus may be at a separate landing site constructed away from the airport in order to avoid disruption of normal air traffic in the event of an emergency.

A non-flying, ground-based recovery vehicle 12 is disposed within the channel 10. The channel 10 serves to retain the recovery vehicle 12 along a predetermined track or course defined by the channel 10. The recovery vehicle 12 includes an articulating recovery cradle 14 disposed atop the recovery vehicle. The cradle 14 is selectively raised and lowered as the aircraft recovery operation develops. The recovery vehicle 12 is preferably operated by a human crew, rather than being completely automated. A vehicle operator position 16 is provided in the recovery vehicle 12, preferably toward the forward portion thereof. A systems operator position 18 is provided at a separate location within the recovery vehicle 12. Alternatively, the vehicle operator and systems operator positions may be combined in a single location, if desired, and/or an assistant operator position may be provided. Appropriate coolant systems may be incorporated for the comfort of the crew. The vehicle operator is responsible for controlling the acceleration, speed, and deceleration of the vehicle 12, while the systems operator is responsible for operating the various controls that provide for capture of the disabled aircraft.

Figure 2:
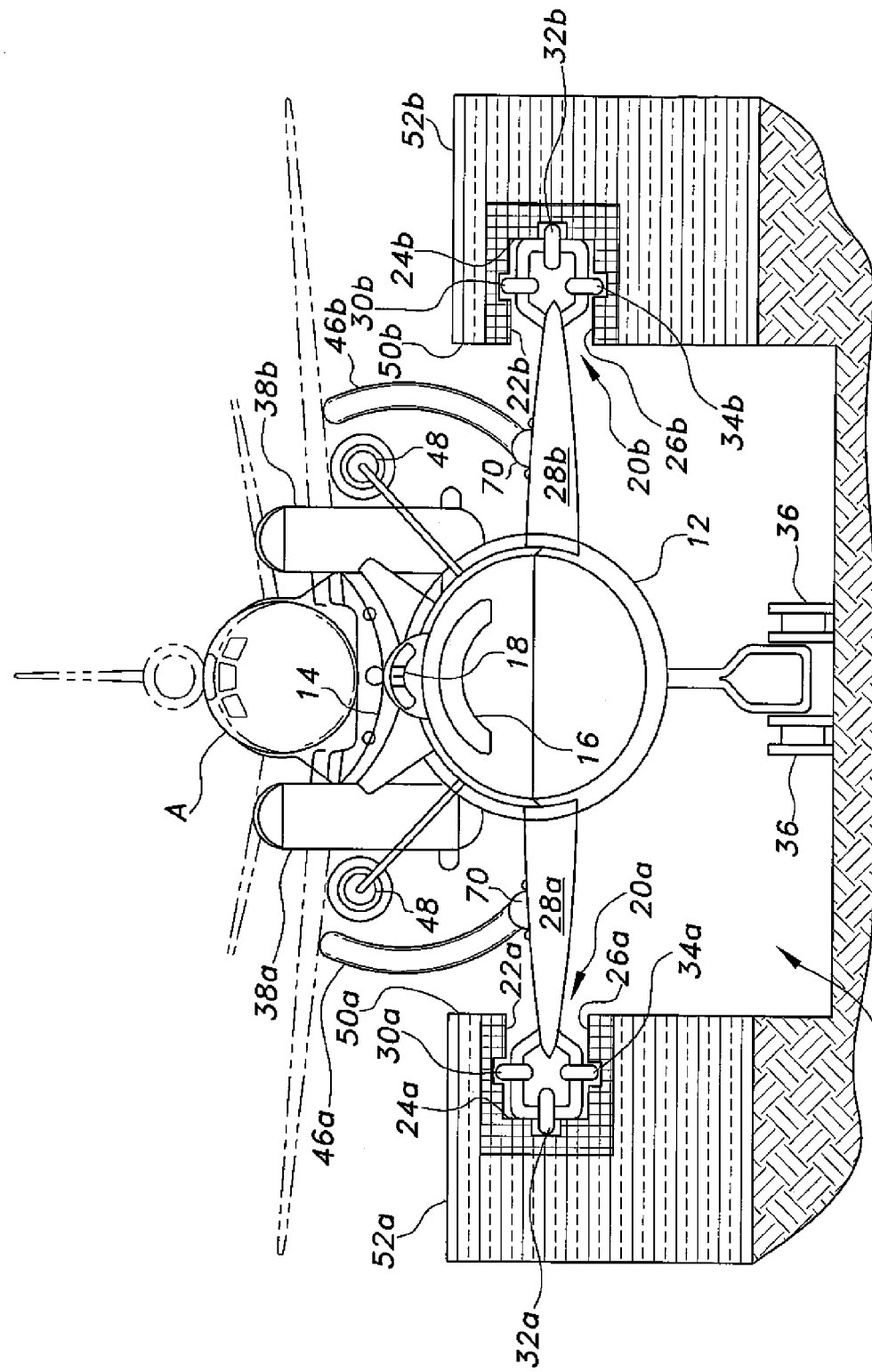
FIG. 2 is a front elevation view in section through the recovery vehicle channel of the ground-based recovery system for aircraft with disabled landing gear according to the present invention, showing the front of the recovery vehicle and a disabled aircraft secured thereon.

FIG. 2 of the drawings provides a front elevation view in section through the recovery vehicle channel 10 and the recovery vehicle 12 installed therein. A disabled aircraft A is shown atop the recovery vehicle 12. This drawing illustrates a scenario wherein the aircraft A with disabled landing gear has been safely recovered aboard the recovery vehicle 12. Mutually opposed first and second lateral slots 20a, 20b are provided along the sidewalls of the channel 10. Each of the slots 20a, 20b has an upper surface 22a, 22b, a sidewall 24a, 24b, and a lower surface 26a, 26b.

The recovery vehicle 12 has at least one, and preferably a plurality, of mutually opposed lateral arms 28a and 28b extending therefrom having distal ends extending into the respective lateral slots 20a, 20b of the channel 10. It should be noted that these arms 28a, 28b are not airfoils, and do not provide any aerodynamic lift. One or more upstop wheels 30a, 30b extend from the distal end of each of the arms 28a, 28b and bear against the upper surfaces 22a, 22b of the respective slots 20a and 20b. In a similar manner, one or more side friction wheels 32a, 32b extend from the distal end of each of the arms 28a, 28b and bear against the sidewalls 24a, 24b of the respective slots 20a and 20b, and one or more lower wheels 34a, 34b extend from the distal end of each of the arms 28a, 28b and bear against the lower surfaces 26a, 26b of the respective slots 20a and 20b. Additional inset tracks or grooves may be formed in each of the surfaces or walls 22a through 26b of the slots 20a, 20b to provide further positive retention of the recovery vehicle arms 28a, 28b, if desired. The recovery vehicle 12 also preferably includes larger support wheels 36 extending therebelow, and riding along the bottom surface of the channel 10.

The ground-based recovery system further includes several features to enhance the recovery operation and to positively secure and retain the disabled aircraft A upon the recovery vehicle 12. FIG. 1 of the drawings illustrates these various features, and other Figs. provide further illustrative details for these features. For example, it is required that the disabled aircraft A be restrained from moving either too far forward or aft upon the recovery vehicle 12. This restraint is accomplished by mutually opposed, laterally disposed first and second leading edge wing restraints 38a, 38b and mutually opposed, laterally disposed first and second trailing edge wing restraints 40a, 40b extending from the recovery vehicle 12.

In addition to the above-described restraints, the system includes a plurality of laterally opposed first and second side fuselage retaining straps 42a, 42b that extend from the recovery cradle 14 of the vehicle 12. These straps 42a, 42b are shown in their retracted positions in FIGS. 3 and 4, and may be selectively deployed and secured to one another by appropriate connection means, e.g., remotely actuated clasps or fasteners 44, as shown in FIGS. 1 and 5 of the drawings. The fasteners 44 are disconnected from one another after the recovery operation is complete.

The system may further include laterally opposed first and second wing suction tubes 46a, 46b that are selectively extended from the arms 28 of the recovery vehicle 12. These tubes 46a and 46b provide significant suction to the lower surfaces of the wings of the disabled aircraft A once the aircraft has been lowered to the recovery vehicle 12 to provide further positive retention of the aircraft on the recovery vehicle. The recovery vehicle 12 may include additional safety features, e.g., selectively extendable and deployable fire extinguishers 48 that may be extended to dispense a fire extinguishing agent into the intake(s) and exhaust(s) of the engine(s) of the disabled aircraft A, as required.

FIG. 1 provides illustrations of additional ground-based safety systems and devices that may be provided with the ground-based aircraft recovery system. The aircraft recovery channel 12 is preferably formed to have a depth sufficient to position the recovery vehicle 12 substantially below grade, generally as shown in FIGS. 1 and 2 of the drawings. The channel 10 has laterally opposed first and second sides 50a, 50b, from which laterally opposed first and second surfaces 52a and 52b extend. These surfaces are on-grade for the immediate surrounding area and provide for the placement of additional safety features.

One such safety feature comprises first and second rows of guidance sensors 54 installed substantially parallel to the channel 10. These sensors 54 may comprise visual or infrared visibility sensors or detectors. The detector images are provided to a monitor aboard the recovery vehicle 12. Similar monitors may be provided aboard aircraft that may have occasion to use the recovery system.

The system also incorporates strong channel marker lights 56 in parallel rows to each side of the channel 10. The channel marker lights 56 and sensors 54 may be placed in the same row on each side of the channel 10 to alternate with one another, as shown in FIG. 1. The channel marker lights 56 may comprise relatively strong laser projectors to penetrate conditions of poor visibility or visible moisture, e.g., fog, smoke, etc.

In addition, fog dispersal units 58 may be installed along each side of the channel 10. These units 58 may comprise small jet engines. Heated exhaust from the small jet engines 58 assist in the evaporation of visible moisture, and the exhaust blast from the engines 58 assists in moving the mass of saturated air from the area.

Figure 3:
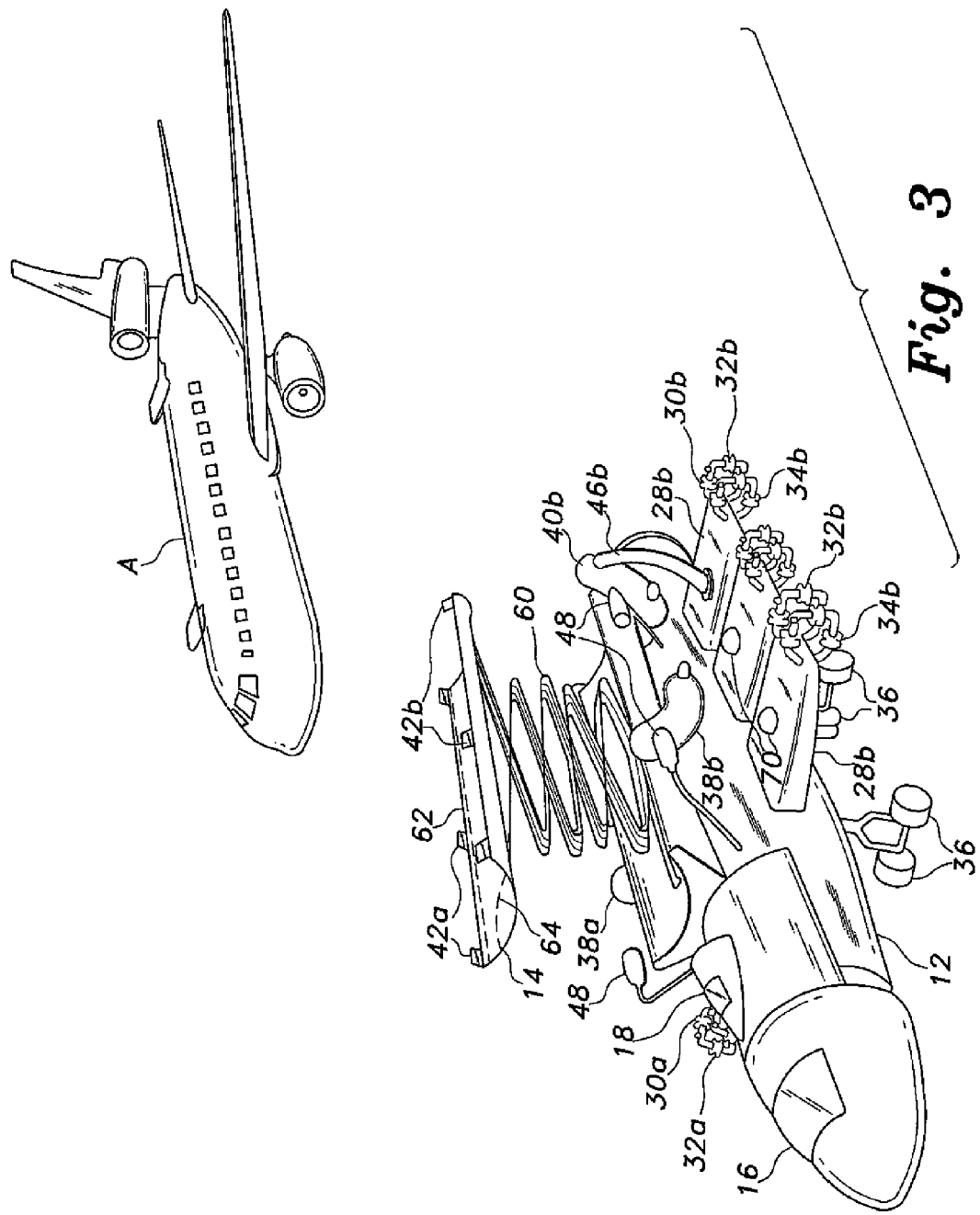
FIG. 3 is an perspective view of the recovery vehicle of the ground-based recovery system for aircraft with disabled landing gear according to the present invention, showing the elevated support cradle and a disabled aircraft about to land thereon, the recovery vehicle channel being omitted for clarity.
Figure 4:
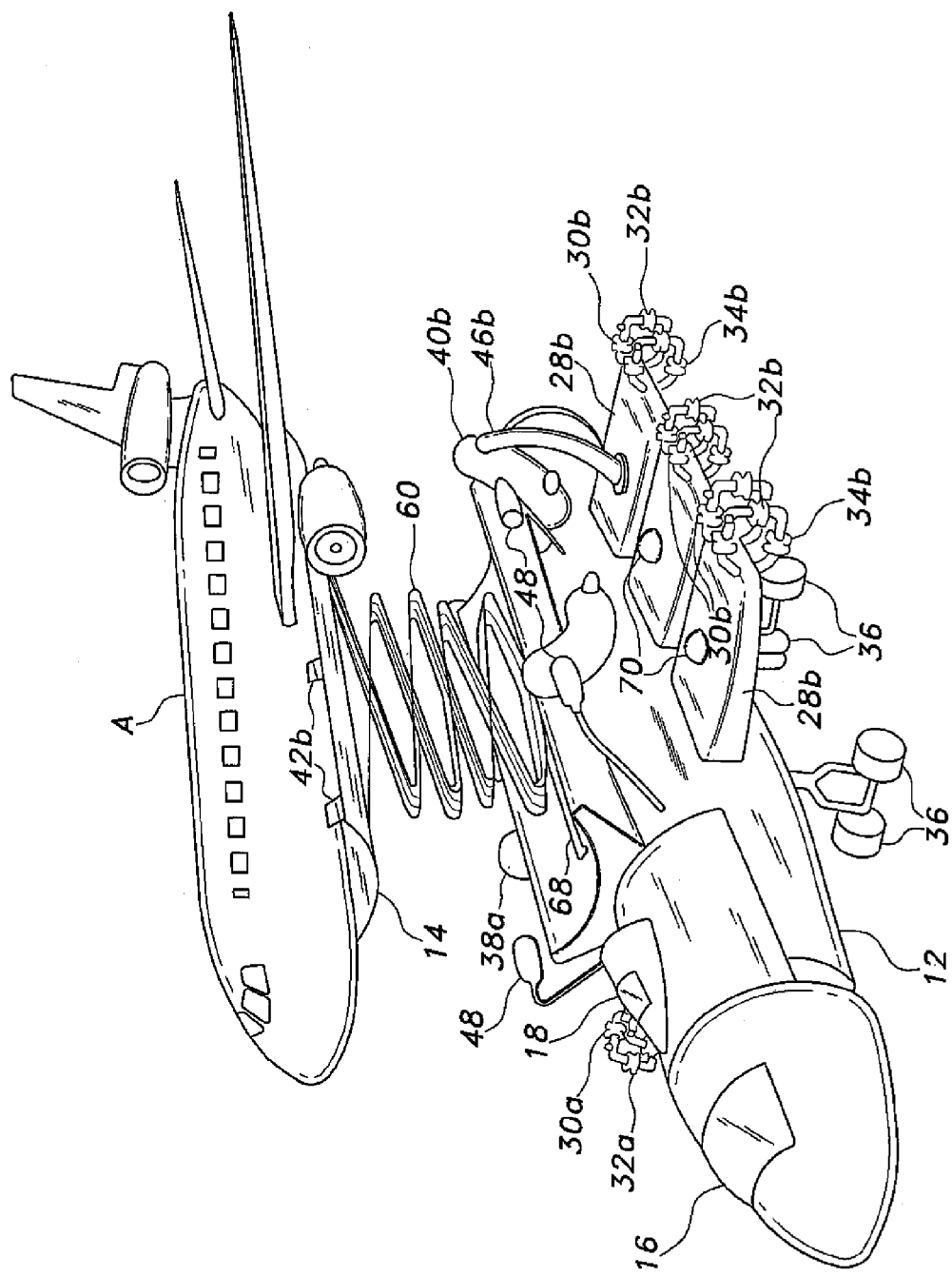
FIG. 4 is a perspective view of the recovery vehicle of the ground-based recovery system for aircraft with disabled landing gear according to the present invention showing the elevated support cradle and a disabled aircraft resting thereon, the recovery vehicle channel being omitted for clarity.
Figure 5:
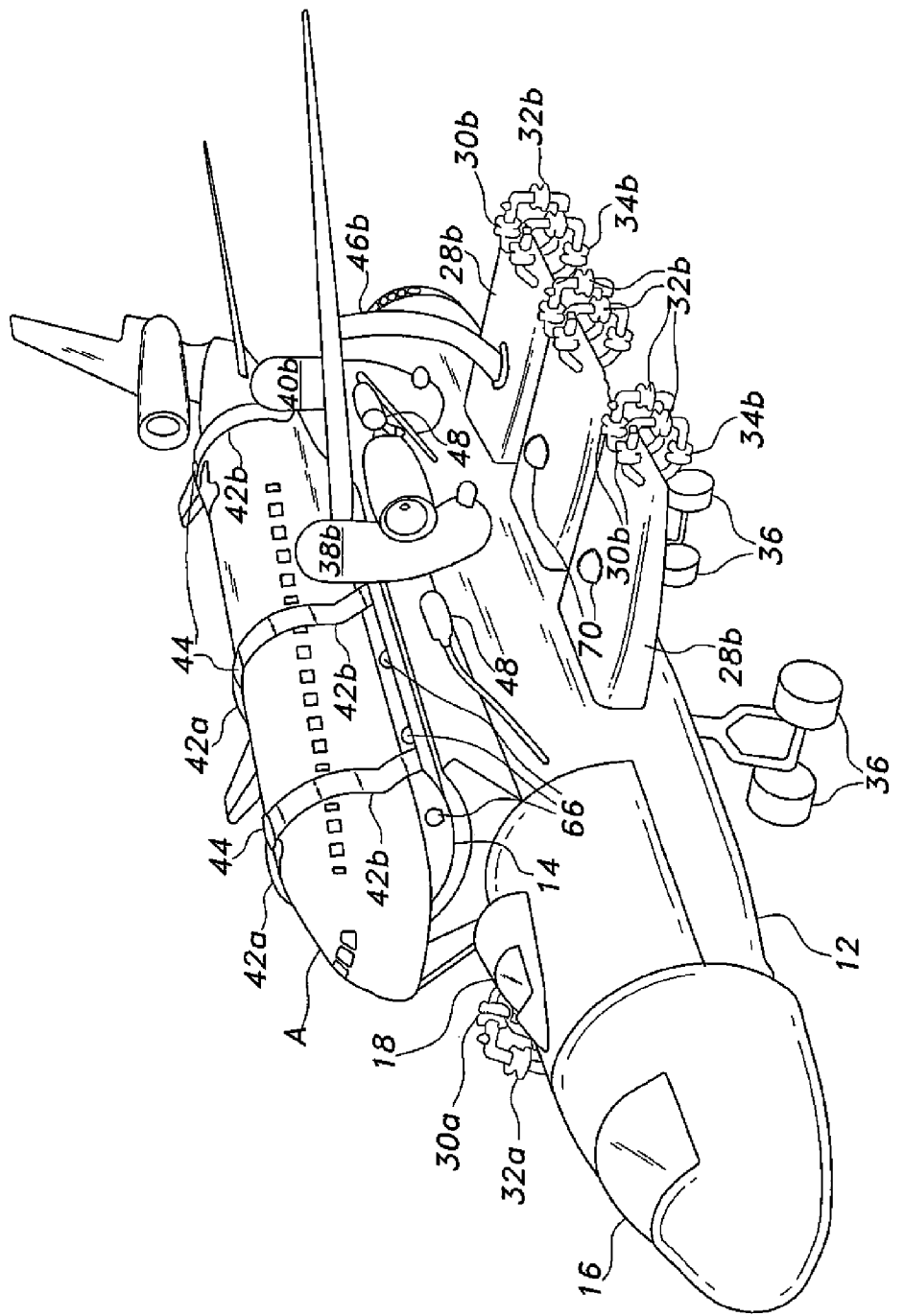
FIG. 5 is a perspective view of the recovery vehicle of the ground-based recovery system for aircraft with disabled landing gear according to the present invention, showing the support cradle nested atop the recovery vehicle and a disabled aircraft secured thereto, the recovery vehicle channel being omitted for clarity.

FIGS. 3 through 5 illustrate the basic steps in the progressive capture and recovery of an aircraft A with disabled landing gear. The channel 10 and its various features have been omitted in FIGS. 3 through 5 in order to provide greater clarity in the drawings, for the various features directly associated with the recovery vehicle 12 and disabled aircraft A. In FIGS. 3 and 4, the articulating landing cradle 14 has been raised well above the recovery vehicle 12 in order to receive the approaching disabled aircraft A. It will be understood that at this point, the recovery vehicle 12 has accelerated along the channel 10 to closely match the groundspeed of the disabled aircraft A as it touches down on the cradle 14. The cradle 14 is supported from the recovery vehicle 12 by a pantograph linkage 60, or other suitable scissors jack mechanism that allows the cradle 14 to be selectively lifted from and lowered to the recovery vehicle 12. FIG. 3 also illustrates additional perimeter lighting 62 and positional alignment lighting 64 that may be provided on the cradle 14. While the primary purpose of such lighting is to assist the flight crew of the disabled aircraft A to properly align and alight upon the cradle 14 in periods of darkness and/or poor visibility, such supplemental lighting may be of some assistance in better weather as well.

FIG. 4 illustrates a further step in the recovery procedure, wherein the disabled aircraft A has landed upon the recovery cradle 14. At this point the pantograph linkage 60 has yet to be lowered to lower the recovery cradle 14 to the top of the recovery vehicle 12. The leading and trailing edge wing restraints 38*a* through 40*b* and retaining straps 42*a*, 42*b* remain retracted laterally to provide clearance for the disabled aircraft as the recovery cradle 14 is lowered.

Finally in FIG. 5, the disabled aircraft A has been lowered to the top of the recovery vehicle 12. The leading and trailing edge wing restraints 38*a* through 40*b* and retaining straps 42*a*, 42*b* have been closed toward the structure of the disabled aircraft A to secure it positively to the cradle 14, and the strap fasteners 44 have been remotely secured to connect each of the two laterally opposed strap members 42*a*, 42*b* to one another over the fuselage of the disabled aircraft A. In FIG. 5, it will be seen that the recovery cradle 14 may incorporate additional features, such as rollers 66, to enable the disabled aircraft A to smoothly position itself within the cradle 14. Additional cameras 68 (FIG. 4) may be provided on the cradle 14 that transmit to a monitor on board the disabled aircraft A to allow the flight crew to accurately position the aircraft A above the cradle 14. Additional cameras 70 may be provided on the upper surfaces of the recovery vehicle arms 28 to enable the recovery vehicle crew and flight crew of the disabled aircraft A (with appropriate receiver and monitor aboard the disabled aircraft A) to determine their proximity to one another during the recovery operation.

It is to be understood that the present invention is not limited to the embodiments described above, but encompasses any and all embodiments within the scope of the following claims.

I claim:

1. A ground-based recovery system for aircraft with disabled landing gear, comprising:
   a recovery vehicle channel having elongated and mutually opposed lateral slots extending along the length of the channel, each of the slots having an upper surface, a sidewall, and a lower surface;
   a recovery vehicle disposed within the channel;
   the recovery vehicle includes a vehicle operator position and a systems operator position;
   wherein the vehicle operator position is disposed within the recovery vehicle; the systems operator position disposed within the recovery vehicle, and the systems operator position being separated from the vehicle operator position;
   and an articulating recovery cradle disposed atop the recovery vehicle;
   wherein the articulating recovery cradle includes scissor jack mechanism moving the cradle vertically with respect to the recovery vehicle so as to capture the disabled vehicle at an upper position, and lower the cradle and disabled vehicle to a lower position atop the recovery vehicle.

2. The ground-based recovery system according to claim 1, wherein:
   the recovery vehicle has at least one pair of arms extending laterally from opposite sides of the recovery vehicle, the arms extending into the corresponding slots on opposing sides of the channel, the arms traveling in the slots when the recovery vehicle travels in the channel and constraining the recovery vehicle to linear travel in the channel, each of the arms having:
   at least one upstop wheel bearing against the upper surface of the corresponding slot;
   at least one side friction wheel bearing against the sidewall of the corresponding slot; and
   at least one lower wheel bearing against the lower surface of the corresponding slot; and
   the recovery vehicle has a turbojet power source for accelerating the recovery vehicle through the channel at speeds matching the aircraft with disabled landing gear.

3. The ground-based recovery system according to claim 1, wherein the recovery vehicle channel is elongate and has laterally opposed first and second sides, the system further comprising:
   a row of guidance sensors extending substantially parallel to the channel on each side of the channel;
   a row of channel marker lights extending substantially parallel to the channel on each side of the channel; and
   a row of fog dispersal units extending substantially parallel to the channel on each side of the channel.

4. The ground-based recovery system according to claim 1, further comprising:
   first and second leading edge wing restraints adjustably extending from opposite sides of the recovery vehicle; and
   first and second trailing edge wing restraints adjustably extending from opposite sides of the recovery vehicle.

5. The ground-based recovery system according to claim 1, further comprising a plurality of fuselage retaining straps adjustably extending from opposite sides of the recovery cradle, the straps having fasteners for securing the straps around a fuselage of an aircraft resting on the cradle.

6. The ground-based recovery system according to claim 1, further comprising wing suction tubes selectively extending from opposite sides of the recovery vehicle.

7. A ground-based recovery system for aircraft with disabled landing gear, comprising:
- an elongate recovery vehicle channel having opposing sides and slots extending along the opposite sides of the channel, each of the slots having an upper surface, a side wall, and a lower surface;
- a recovery vehicle disposed within the channel, the vehicle having at least one pair of arms extending from opposite sides of the recovery vehicle, each of the arms extending into a corresponding slot on opposite sides of the channel, the arms traveling in the slots and constraining the recovery vehicle to linear travel in the channel, each of the arms having:
- at least one upstop wheel bearing against the upper surface of the corresponding slot;
- at least one side friction wheel bearing against the sidewall of the corresponding slot; and
- at least one lower wheel bearing against the lower surface of the corresponding slot;
- the recovery vehicle further including;
- a vehicle operator position and a systems operator position;
- a recovery cradle disposed atop the recovery vehicle;
- a pantograph linkage disposed on the recovery vehicle for selectively lifting and lowering the recovery cradle above the recovery vehicle; and
- a plurality of fuselage retaining straps adjustably extending from opposite sides of the recovery cradle, the straps having fasteners for securing the straps around a fuselage of an aircraft resting on the cradle;
- a plurality of selectively extendable and deployable fire extinguishers disposed on the recovery vehicle; and
- a plurality of wing suction tubes selectively extending from opposite sides of the recovery vehicle.

8. The ground-based recovery system according to claim 7, wherein the recovery vehicle channel is elongate and has laterally opposed first and second sides, the system further comprising:
- a row of guidance sensors extending substantially parallel to the channel on each side of the channel;
- a row of channel marker lights extending substantially parallel to the channel on each side of the channel; and
- a row of fog dispersal units extending substantially parallel to the channel on each side of the channel.

9. The ground-based recovery system according to claim 7, further comprising:
- first and second leading edge wing restraints adjustably extending from opposite sides of the recovery vehicle; and
- first and second trailing edge wing restraints adjustably extending from opposite sides of the recovery vehicle.

10. The ground-based recovery system according to claim 7, further comprising:
- a vehicle operator position disposed within the recovery vehicle; and
- a systems operator position disposed within the recovery vehicle, the systems operator position being separated from the vehicle operator position.

11. A ground-based recovery system for aircraft with disabled landing gear, comprising:
- an elongate recovery vehicle channel having a bottom, and laterally opposed first and second sides;
- the channel further including mutually opposed lateral slots extending along the length of the channel in each of the laterally opposed first and second sides, each one of the slots having an upper surface, a sidewall, and a lower surface;
- a recovery vehicle disposed within the channel and constrained to linear travel in the channel;
- the recovery vehicle has at least one pair of arms extending laterally from opposite sides of the recovery vehicle, the arms extending into the corresponding slots on opposing sides of the channel, the arms traveling in the slots when the recovery vehicle travels in the channel and constraining the recovery vehicle to linear travel in the channel, each of the arms having:
- at least one upstop wheel bearing against the upper surface of the corresponding slot;
- at least one side friction wheel bearing against the sidewall of the corresponding slot; and
- at least one lower wheel bearing against the lower surface of the corresponding slot;
- an articulating recovery cradle including a pantograph linkage means disposed between the cradle and the recovery vehicle for selectively lifting and lowering the recovery cradle above the recovery vehicle; and
- a plurality of fuselage retaining straps adjustably extending from opposite sides of the recovery cradle, the straps having fasteners for securing the straps around a fuselage of an aircraft resting on the cradle;
- a row of guidance sensors extending substantially parallel to the channel on each side of the channel;
- a row of channel marker lights extending substantially parallel to the channel on each side of the channel; and
- a row of fog dispersal units extending substantially parallel to the channel on each side of the channel;
- first and second leading edge wing restraints adjustably extending from opposite sides of the recovery vehicle; and
- first and second trailing edge wing restraints adjustably extending from opposite sides of the recovery vehicle;
- wing suction tubes selectively extending from opposite sides of the recovery vehicle; and
- a vehicle control unit disposed within the recovery vehicle; and
- a systems control unit disposed within the recovery vehicle.

12. The ground-based recovery system according to claim 11, wherein the systems control unit and the vehicle control unit are separately disposed from each other on the recovery vehicle.

\* \* \* \* \*